Patented July 14, 1925.

1,545,811

UNITED STATES PATENT OFFICE.

ALFRED CHARLES BUENSOD, OF NEW YORK, N. Y.

CONSTANT-TEMPERATURE METHOD OF CURING AND TREATING TOBACCO.

No Drawing. Application filed March 14, 1917, Serial No. 154,844. Renewed November 21, 1924.

*To all whom it may concern:*

Be it known that I, ALFRED CHARLES BUENSOD, a citizen of the United States of America, residing in the city, county, and State of New York, have invented new and useful Constant-Temperature Methods of Curing and Treating Tobacco, of which the following is a full, clear, and exact description.

My method of treating tobacco refers generally to the curing of tobacco and more particularly to treatment such as outlined in my copending application Serial No. 154,843, filed March 14, 1917 which describes a method of curing and treating tobacco.

It is well known to those skilled in the art that all tobacco, before it can be placed upon the market, must be cured. This treatment is such as to bring about certain chemical changes in the composition of the leaf; namely, the development of the desired color, the regulation of the temperature retaining capacity, the control of the texture, fire holding capacity and the elasticity, and the production of the proper keeping qualities of the tobacco.

When the green tobacco leaf is hung in an absolutely dark chamber, its moisture supply through the root system being cut off, a period of starvation sets in, and the reserve supply of food stored in the leaf is consumed. The green leaf always contains certain enzyms which take an active part in the chemical changes throughout the curing process, and, in the period of cell starvation, they are greatly increased. The formation of the color of the cured tobacco leaf is entirely due to the oxidation of the cell substance through the medium of an enzym. These coloring enzyms act upon the cell substance and produce the various final colors in the leaf, depending upon the duration of the action, the amount of enzyms present, and the amount of moisture still retained by the cells, which moisture acts as a carrier. This oxidation may be so controlled as to produce a lemon yellow, an orange, a brown, a greenish brown, or a dark brown color. To obtain the yellow color, it is necessary to slowly starve the leaf and to allow sufficient time for the starch to be dissolved, thereby causing the natural death of the cells. In the curing process, the intensity of the chemical actions and the time necessary for a thorough cure are dependent upon the temperatures used. The excess moisture of the leaf is liberated and must be carried away as the leaf is gradually starved and colored. If the moisture in the leaf is extracted rapidly, or if the leaf is subjected to unfavorable temperatures or poisons, the cells would be prematurely killed before the starch could be dissolved and the green color would thereby be set in the leaf. If the coloring enzyms were still alive they would act on the cell substance and produce colors showing over the green color of the leaf.

After tobacco has been cured, it is too brittle to be handled and must therefore have its moisture content increased; such moisture content is also sometimes increased for the purpose of further treatment of the leaf.

The principal object of my invention has been to provide a continuous method of treating tobacco, which preferably is carried on in darkness, and under conditions in which the temperature and relative humidity may be absolutely governed, so that the chemical changes going on in the leaf may be easily controlled, thereby producing the desired properties in the leaf.

In carrying out my invention, the green tobacco leaves are suspended in a suitable curing apparatus and subjected to the passage of continuously circulating air currents of a certain predetermined temperature and relative humidity. In my present method, the temperature of the air is maintained at substantially a uniform degree and its percentage of relative humidity is lowered until the tobacco has reached the desired stage, whereupon the percentage of relative humidity is raised, thus supplying the necessary moisture to avoid breakage in handling and for further treatment.

In practice, I prefer to use air at a temperature of 75° to 85° F. and at a relative humidity of 80%. The method is carried on under these conditions for a length of time sufficient to consume the surplus food contained in the leaf and cause the death of the cells. The temperature of the treating air is maintained at substantially the same temperature and the percentage of relative humidity of the air is then gradually lowered until a percentage of 70 is reached, at which time the tobacco will be thoroughly cured. Before the tobacco is removed from the apparatus, and while maintaining the temperature at substantially the same degree, the moisture content of the tobacco is increased by raising the percentage of relative humidity of the air up to between 80% and 85%.

Having thus described my invention, what I claim is:

1. A method of curing tobacco which consists in subjecting it, for a sufficient length of time, to air currents which are maintained at substantially a uniform temperature of from 75° to 85° F. and a relative humidity of 80% until the surplus food contained in the leaf has been consumed and the cells have died, and then continuously maintaining the air currents at the same temperature, while gradually lowering the relative humidity thereof until a percentage of 70 is reached.

2. A method of curing and treating tobacco which consists in subjecting it, for a sufficient length of time, to air currents which are maintained at substantially a uniform temperature of from 75° to 85° F. and a relative humidity of 80% until the surplus food contained in the leaf has been consumed and the cells have died, then continuously maintaining the air currents at the same temperature, while gradually lowering the relative humidity thereof until a percentage of 70 is reached, and then maintaining the air currents at substantially the same temperature, and increasing the percentage of relative humidity thereof to from 80% to 85%, thus supplying the necessary moisture to avoid breakage in handling or for further treatment.

3. A method of curing tobacco which consists in subjecting it in darkness, for a sufficient length of time, to air currents which are maintained at substantially a uniform temperature of from 75° to 85° F. and a relative humidity of 80% until the surplus food contained in the leaf has been consumed and the cells have died, and then continuously maintaining the air currents at the same temperature, while gradually lowering the relative humidity thereof until a percentage of 70 is reached.

4. A method of curing and treating tobacco which consists in subjecting it in darkness, for a sufficient length of time, to air currents which are maintained at substantially a uniform temperature of from 75° to 85° F. and a relative humidity of 80% until the surplus food contained in the leaf has been consumed and the cells have died, then continuously maintaining the air currents at the same temperature, while gradually lowering the relative humidity thereof until a percentage of 70 is reached, and then maintaining the air currents at substantially the same temperature, and increasing the percentage of relative humidity thereof to from 80% to 85%, thus supplying the necessary moisture to avoid breakage in handling or for further treatment.

In testimony whereof I have hereunto signed my name.

ALFRED CHARLES BUENSOD.